United States Patent [19]

Heller et al.

[11] Patent Number: 4,500,952
[45] Date of Patent: Feb. 19, 1985

[54] MECHANISM FOR CONTROL OF ADDRESS TRANSLATION BY A PROGRAM USING A PLURALITY OF TRANSLATION TABLES

[75] Inventors: Andrew R. Heller, Morgan Hill, Calif.; William S. Worley, Jr., Endicott, N.Y.

[73] Assignee: International Business Machines Corporation, Armonk, N.Y.

[21] Appl. No.: 152,889

[22] Filed: May 23, 1980

[51] Int. Cl.³ .......................... G06F 9/36; G06F 9/46; G06F 13/00
[52] U.S. Cl. ...................................................... 364/200
[58] Field of Search ... 364/200 MS File, 900 MS File

[56] References Cited

U.S. PATENT DOCUMENTS

| Re. 27,251 | 12/1971 | Amdahl et al. | 364/200 |
|---|---|---|---|
| 3,902,163 | 8/1975 | Amdahl et al. | 364/200 |
| 3,970,999 | 7/1976 | Elward | 364/200 |
| 4,037,214 | 7/1977 | Birney et al. | 364/200 |
| 4,038,645 | 7/1977 | Birney et al. | 364/200 |
| 4,068,303 | 1/1978 | Morita | 364/200 |
| 4,084,226 | 4/1978 | Anderson et al. | 364/200 |
| 4,104,718 | 8/1978 | Poublan et al. | 364/200 |
| 4,136,385 | 1/1979 | Gannon et al. | 364/200 |
| 4,173,783 | 11/1979 | Couleur et al. | 364/200 |
| 4,177,510 | 12/1979 | Appell et al. | 364/200 |
| 4,206,503 | 6/1980 | Woods et al. | 364/200 |
| 4,241,401 | 12/1980 | DeWard et al. | 364/200 |
| 4,285,040 | 8/1981 | Carlson et al. | 364/200 |
| 4,297,743 | 10/1981 | Appell et al. | 364/200 |
| 4,325,120 | 4/1982 | Colley et al. | 364/200 |
| 4,326,248 | 4/1982 | Hinai et al. | 364/200 |
| 4,355,355 | 10/1982 | Butwell et al. | 364/200 |
| 4,408,274 | 10/1983 | Wheatley et al. | 364/200 |
| 4,447,874 | 5/1984 | Bradley et al. | 364/200 |
| 4,459,661 | 7/1984 | Kaneda et al. | 364/200 |

OTHER PUBLICATIONS

IBM System/370 Principles of Operation, Form No. GA22-7000-4, File No. S/370-01.

Primary Examiner—Raulfe B. Zache
Assistant Examiner—A. E. Williams, Jr.
Attorney, Agent, or Firm—Robert W. Berray

[57] ABSTRACT

One program in one address space is permitted to obtain access to data in another address space or to call a program in another address space without invoking a supervisor. Each of a plurality of address spaces assigned an Address Space Number (ASN) has an associated set of address translation tables. A second address space can be designated by a program, and when authorized, can cause transfer of data in main memory from one physical location to another associated with the different address space. A program changeable space selection control bit controls use of two different sets of address translation tables associated with two different address spaces. Without invoking a supervisor, a particular program in an assigned address space can call a program in another address space or obtain addressability to data in another address space having an associated set of address translation tables.

7 Claims, 17 Drawing Figures

FIG. 1 PRIOR ART
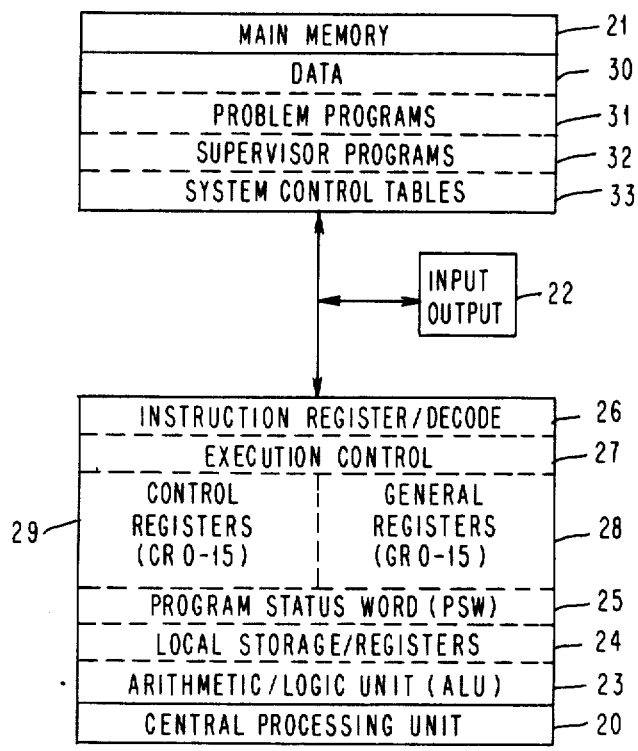
FIG. 2
RRE FORMAT
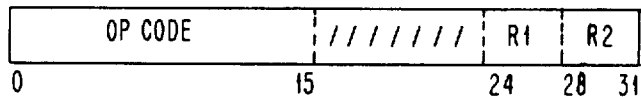
S FORMAT
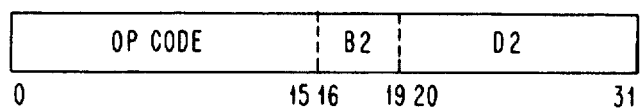
SS FORMAT
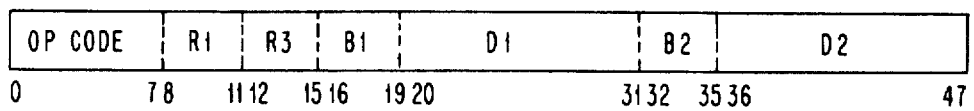

FIG. 3 CONTROL REGISTERS

| REG NO | | | | | | |
|---|---|---|---|---|---|---|
| 0 | | | E 4 | S 5 | | |
| 1 | \_ \_ | PRIMARY-SEGMENT-TABLE DESIGNATION (PSTD) \_ \_ \_ \_ | | | | |
| | 0 LENGTH 7 | 8 SEGMENT TABLE ORIGIN (PSTO) 25 | | | | |
| 2 | | | | | | |
| 3 | 0 | KEY MASK (KM) 15 | | 16 | SECONDARY ADDRESS SPACE NUMBER (SEC ASN) 31 | |
| 4 | 0 | AUTHORIZATION INDEX (AX) 15 | | 16 | PRIMARY ADDRESS SPACE NUMBER (PRI ASN) 31 | |
| 5 | \_ \_ | LINKAGE-TABLE DESIGNATION | | | | \_ \_ \_ \_ |
| | V | 8 LINKAGE-TABLE ORIGIN (LTO) 24 | 25 | | LENGTH 31 | |
| 6 | | | | | | |
| 7 | \_ \_ | SECONDARY-SEGMENT-TABLE DESIGNATION (SSTD) \_ \_ \_ \_ | | | | |
| | 0 LENGTH 7 | 8 SEGMENT TABLE ORIGIN (SSTO) 25 | | | | |
| 8 | | | | | | |
| 9 | | | | | | |
| 10 | | | | | | |
| 11 | | | | | | |
| 12 | | | | | | |
| 13 | | | | | | |
| 14 | | V 12 | 20 | ASN-FIRST-TABLE ORIGIN (AFTO) 31 | | |
| 15 | | | | | | |

FIG. 4 PROGRAM STATUS WORD (PSW)

| 0 R 0 0 0 T I 0 E | KEY | I M W P S 0 | CC | PROGRAM MASK | 0 0 0 0 0 0 0 |
|---|---|---|---|---|---|
| 0             8   11 12 | | 16 | 18 | 20 | 24           31 |

| 0 0 0 0 0 0 0 | INSTRUCTION ADDRESS |
|---|---|
| 32            40 | 63 |

FIG. 5  PROGRAM-SUBSYSTEM-CONTROL-FACILITY TABLE ENTRIES

LINKAGE TABLE ENTRY (LTE)

| I | 0000000 | ETO | ETL | — 34 |
|---|---------|-----|-----|------|
| 1 | 8       |     | 26  | 31   |

ENTRY TABLE ENTRY (ETE)

| AUTH KEY MASK (AKM) | EASN | 00000000 | INSTRUCTION ADDRESS (EIA) | P |
|---------------------|------|----------|---------------------------|---|
| 0                   | 16   | 32       | 40                        | 63 |

— 35

| | ENTRY PARAMETER | ENTRY KEY MASK (EKM) | |
|---|----------------|----------------------|---|
| 64 |                | 96                  | 112 | 127 |

ASN FIRST TABLE ENTRY (AFTE)

| I | 0000000 | ASTO | 0000 | — 36 |
|---|---------|------|------|------|
| 0 | 1    8  |      | 28   | 31   |

ASN SECOND TABLE ENTRY (ASTE)

| I | 0000000 | AUTHORITY TABLE ORIGIN (ATO) | 00 | AUTHORITY INDEX (AX) | AUTHORITY TABLE LENGTH (ATL) | 0000 |
|---|---------|------------------------------|----|-----|------------------------------|------|
| 0 | 1    8  |                              | 30 | 32  | 48                           | 60   63 |

— 37

|← STD →|← LTD →|
| STL | STO | / | X | V | 0000000 | LTO | LTL |
|-----|-----|---|---|---|---------|-----|-----|
| 64  | 72  | 90 | 95 | 97 | 104 | 121 | 127 |

AUTHORITY TABLE (AT)

PTss ┐   ┌ SSARss

|  | P | S | — 38 |
|--|---|---|------|

|← CR4(AX) →|
| 0 |

R: ADDRESS IS REAL

FIG. 14

| PROGRAM SUBSYSTEM-CONTROL INSTRUC-TION | AUTHORIZATION MECHANISM | | | | | |
|---|---|---|---|---|---|---|
| | EXTRACTION AUTHORITY CONTROL (CR0.4) | PSW KEY-MASK (CR3.0-15) | SUBSYSTEM-LINKAGE CONTROL (CR5.0) | SECONDARY-SPACE CONTROL (CR0.5) | ASN-TRANSLATION CONTROL (CR14.12) | AUTHORIZATION INDEX (CR4.0-15) |
| EPAR | P | | | | | |
| ESAR | P | | | | | |
| IAC | P | | | | | |
| IPK | P | | | | | |
| IVSK * | P | | | | | |
| MVCP * | | P | | SO | | |
| MVCS * | | P | | SO | | |
| MVCK | | P | | | | |
| PC-cp** | | P | SO | | | |
| PC-ss** | | P | SO | | SO | |
| PT-cp** | | | SO | | | |
| PT-ss** | | | SO | | SO | PA |
| SAC | | | | SO | | |
| SPKA | | P | | | | |
| SSAR-cp | | | | | SO | |
| SSAR-ss | | | | | SO | SA |

EXPLANATION:

- P  AUTHORITY CHECKED ONLY IN PROBLEM STATE: VIOLATION CAUSES A PRIVILEGED-OPERATION EXCEPTION.

- SO  AUTHORITY CHECKED IN PROBLEM AND SUPERVISOR STATES: VIOLATION CAUSES A SPECIAL-OPERATION EXCEPTION.

- *  CPU MUST BE IN PRIMARY-SPACE MODE OR SECONDARY-SPACE MODE: IF THE CPU IS IN REAL MODE, A SPECIAL-OPERATION EXCEPTION IS RECOGNIZED IN BOTH PROBLEM AND SUPERVISOR STATES.

- **  CPU MUST BE IN PRIMARY-SPACE MODE: IF THE CU IS IN SECONDARY-SPACE MODE OR IN REAL MODE, A SPECIAL-OPERATION EXCEPTION IS RECOGNIZED IN BOTH PROBLEM AND SUPERVISOR STATES.

- PA  AUTHORITY CHECKED IN PROBLEM AND SUPERVISOR STATES: VIOLATION CAUSES A PRIMARY-AUTHORITY EXCEPTION.

- SA  AUTHORITY CHECKED IN PROBLEM AND SUPERVISOR STATES: VIOLATION CAUSES A SECONDARY-AUTHORITY EXCEPTION.

MECHANISM FOR CONTROL OF ADDRESS TRANSLATION BY A PROGRAM USING A PLURALITY OF TRANSLATION TABLES

BACKGROUND OF THE INVENTION

1. Related Applications

On even date herewith, the following related applications were filed: (1) "Authorization Mechanism For Transfer Of Program Control Or Data Between Different Address Spaces Having Different Storage Protect Keys" by A. Heller et al, now U.S. Pat. No. 4,366,537 and (2) "Authorization Mechanism For Establishing Addressability to Information in Another Address Space" by J. A. Cannavino et al, now U.S. Pat. No. 4,430,705.

2. Field Of The Invention

This invention relates generally to data processing systems and more particularly to program or data protection hardware and techniques.

3. Description Of The Prior Art

Any stored program data processing system that provides for multiprogramming, multiprocessing, virtual memories, or a supervisor program providing for a multiple virtual system must be concerned with the protection of data and/or programs from inadvertent or unauthorized use or modification. A widely published form of this protection is that described in connection with Multics which is an operating system developed primarily by Massachusetts Institute of Technology in cooperation with General Electric Company and others, and first implemented on a Honeywell 635 Computer. This technique has been recently described in U.S. Pat. No. 4,177,510. Another form of protection mechanism is disclosed in U.S. Pat. No. 4,038,645, assigned to the assignee of the present invention, and is descriptive of the technique utilized in the IBM Series/1 computer system.

A particular form of prior protection mechanism, more closely associated with the present invention, is that defined for the IBM System/370 series of data processing systems. The organizational and hardware/architectural aspects of the IBM System/370 are described in the "IBM System/370 Principles of Operation", Form No. GA22-7000-4, File No. S/370-01. In the IBM System/370, the basic form of data protection is accomplished by the storage protect keys associated with physical blocks of memory and associated with particular programs. This concept is disclosed and claimed in U.S. Pat. No. Re. 27,251 entitled "Memory Protection System", Issued 12/21/71 to G. M. Amdahl et al, and assigned to International Business Machines Corp. A fourbit coded storage protect key associated with physical blocks of memory is compared with a PSW key associated with a program to control access to data. In present IBM System/370 systems, the method by which programs are controlled in their access to data or the ability to call other programs in the data processing system is under strict control of an operating system or supervisor. One such control program is the Multiple Virtual System (MVS) control program. One program can call another program only by alerting the supervisor program by means of a Supervisor Call instruction (SVC), leaving to the supervisor program the determination of the authorization of the calling program to call the called program.

A major IBM System/370 user requirement addressed by this invention is to provide an enhanced method of communication between address spaces in a system operating under MVS. In present systems, there are a number of multi-address space program subsystems, e.g. IMS, TSO/VTAM, VSPC, and JES. These subsystems use a multiple address space structure to separate themselves from their users. This separation provides them with a number of advantages.

By providing their own address space in which to run their programs and keep their private data, they are able to better ensure a recovery environment for their programs and data. If users of the subsystem were to run in the same address space as the subsystem control, the subsystem's recovery could be affected by the user's recovery. If the subsystem's control information is kept in common storage, storage protect keys become the only mechanism to protect the data. However, there are not enough keys (16) to guarantee that the information is protected from an inadvertent store by another subsystem or authorized program since it is commonly addressable.

By using their own private area for keeping their control information, subsystems are able to have up to eight megabytes of addressability for their data. If more than eight megabytes of data is required, the subsystem may use more than one private address space for the data; in effect, extending the 24-bit addressability limit of the 370 architecture. By keeping sensitive data in their own private address space they are able to isolate their data from all unauthorized users in the system.

These are some of the reasons that subsystems use a multi-address space structure; however, there are problems with the communication mechanisms available in MVS for calling programs in another address space and moving/referencing data between two address spaces.

To permit calling of programs or reference data in another address space, the user must be authorized; therefore, most subsystems must embed the mechanisms within Supervisor Call instructions (SVC) to give an interface to the unauthorized user. Solutions require the user to do his own synchronization if a synchronous call is desired and are extremely slow.

Since the 370 architecture supports only one address space at any instant in time, subsystems must put any data that must be shared or moved between the subsystem and its user in common storage. This has a number of undesirable effects. The amount of common storage available for other uses is reduced because it is being used by only a few address spaces. Since the data is globally addressable in all address spaces, the only means of protecting the data against an inadvertent store is through keys. However, there are only sixteen keys, thus no guaranteed way of limiting access to the data can be ensured. If the data contains proprietary information, the only way to protect the security of the data is to fetch protect the data. Opportunities to exploit virtual storage such as virtual data bases are severely limited. If a virtual data base is to be shared among two or more users, the data base must be placed in common storage or the performance benefit of the virtual data will be negated by the slow private-to-private access mechanisms available. However, common storage is a limited resource; therefore virtual data bases must be relatively small.

SUMMARY OF THE INVENTION

To provide enhancement needed for a System/370 to operate with MVS, the present invention introduces the concept of dual address spaces, each with address translation tables, and problem program ability to control use of these tables. The invention is included in a new subsystem control facility that provides: (1) basic authority control with dual address space memory references; (2) program subsystem linkages; and (3) Address Space Number translation to main memory addresses with authorization control.

Basic authority control makes available to problem programs a gradation of privilege or authority. It includes extraction-authority control indicated by bit 4 of control register 0, which allows the following instructions to be executed in the problem state: Insert Address Space Control, Insert PSW Key, and Insert Virtual Storage Key. A PSW-key mask is placed in control register 3. This 16-bit mask is used to control the keys that may be placed in the current PSW by the instruction Set PSW Key From Address. When in the problem program state, the key mask is used to control the keys that may be specified by three move instructions in order to access one of their operands with a key different from the PSW key. The instructions are Move With Key, Move To Primary, and Move To Secondary. The mask is also ANDed with an authorization key mask in an entry-table entry during execution of a Program Call instruction to determine if the program is authorized to call this particular entry point.

An Insert Virtual Storage Key instruction allows the virtual address of a location to be used to examine the storage key associated with the location. For Move With Key, the access key for the source operand is specified as an operand and authorized by the PSW-key mask.

Instructions that can be executed in either the problem state or the supervisor state when certain authority requirements are met are called semiprivileged instructions. Failure to meet the requirements of the extraction-authority control or the PSW-key mask causes a privileged-operation exception to be recognized. The requirements of the extraction-authority control and the PSW-key mask are not enforced when execution is in supervisor state. Other authority requirements for semiprivileged instructions can cause other program exceptions to be recognized, and these other requirements are enforced regardless of whether execution is in the problem state or the supervisor state.

The dual address space concept provides, for the problem program, the ability to move information from one address space into another and also to specify in which address space the operands of the program are to be accessed. It includes, in control register 7, a secondary-segment-table origin and the secondary-segment-table length, which together define the location and extent of the secondary-segment table. The secondary-segment table is used to translate the secondary virtual addresses of the secondary address space, while a primary-segment table in control register 1 is used for the primary virtual addresses of the primary address space. When the normal 370 dynamic address translation facility (DAT) is on, the CPU is said to be in either primary-space mode or secondary-space mode, depending on which segment table is being used.

Bit 5 in control register 0 authorizes the execution of the instructions Set Address Space Control, Move To Primary, and Move to Secondary which move data between the primary and secondary address spaces. The secondary-space access key is specified as an operand and authorized by the PSW-key mask in control register 3.

Address-space control in bit 16 of the PSW, which, when on, causes any logical address to be treated as secondary virtual addresses. The implication is that instructions that are executed in secondary-space mode should be in both address spaces through being in the common area. Instructions Insert Address Space Control and Set Address Space Control, allow the program to inspect and set, respectively, the address-space control bit 16 in the PSW.

Another feature of the present invention provides for direct linkage between problem program executing at different levels of authority, without the use of the Supervisor Call instruction. Control register 5 includes a subsystem-linkage control valid bit, a linkage-table origin, and the linkage-table length. The subsystem-linkage control authorizes the execution of a Program Call and Program Transfer instruction. The linkage-table origin and linkage-table length define the location and extent of the linkage table. The linkage table and the associated entry tables are used during a PC-number-translation process. The contents of an entry-table entry are: authorization key mask, ASN, entry addressing-mode bit, entry instruction address, entry problem-state bit, entry parameter, and entry key mask. The PC-number-translation process occurs during the execution of the Program Call instruction.

Program Call (PC) specifies a PC number, which is used to locate an entry-table entry. If the Program Call is executed in problem state, the authorization key mask in the entry table entry is ANDed with the PSW-key mask in control register 3, with a nonzero result indicating that the program issuing the Program Call is authorized to access the entry. The PSW-key mask and primary ASN, and the addressing-mode bit, instruction address, and problem-state bit of the current PSW, are saved in general registers. The entry addressing-mode bit, entry instruction address, and entry problem-state bit are placed in the current PSW. The entry key mask is ORed with the PSW-key mask, and the PSW-key mask is replaced by the result. The secondary ASN and secondary-segment-table designation are set equal to the primary ASN and primary-segment-table designation, respectively. If the ASN in the entry-table entry is zero, it indicates the current-primary ASN is still effective.

Program Transfer (PT) specifies general registers containing a key mask, ASN, addressing-mode bit, instruction address, and problem-state bit. These contents are normally the ones that were saved by a Program Call. The addressing-mode bit, instruction address, and problem-state bit are placed in the current PSW, except that this is not allowed to cause a change from problem to supervisor state. The key mask is ANDed with the PSW-key mask, and the PSW-key mask is replaced by the result. The secondary ASN is set equal to the specified ASN. If the specified ASN is equal to the current primary ASN, the secondary-segment-table designation is set equal to the primary-segment-table designation.

The Address Space Number (ASN) facility and feature provides the translation tables and authorization controls whereby a program in the problem state can designate an address space as being the primary address space or a secondary address space. This involves possible space-switching operations of the Program Call and Program Transfer Instructions. A Set Secondary ASN instruction is also provided.

ASN translation control is provided by a bit in control register 14 which also stores an ASN first-table origin (AFTO) which defines the location of an ASN first table. The ASN first table and an associated ASN second table are used during the ASN-translation process. The contents of an ASN-second-table entry are: ASX-invalid bit, authority-table origin, authorization index, authority table length, segment table designation, and linkage-table designation. An authority-table entry contains a primary authority bit and secondary authority bit.

The Primary ASN in control register 4 is set equal to the ASN in an entry-table entry by a Program Call instruction with space switching (PC-ss) and the ASN in a general register by a space switching Program Transfer instruction (PT-ss).

A secondary ASN is set in control register 3 equal to (1) the old primary ASN by PC-ss, (2) the new primary ASN by PT-ss, (3) the primary ASN by PC-cp (current primary) and PT-cp, and (4) the ASN in a general register by Set Secondary ASN (SSAR). The corresponding primary-segment-table designation or secondary-segment-table designation is set whenever the primary ASN or secondary ASN, respectively, is set.

An authorization index in control register 4 is used, along with an authority table, to authorize a PT-ss or SSAR-ss operation. It is set during a PC-ss or PT-ss operation.

The Set Secondary ASN (SSAR) instruction sets the secondary ASN equal to an ASN in a general register. SSAR performs either a current-primary (SSAR-cp) operation or a space-switching (SSAR-ss) operation. For SSAR-cp, the specified ASN equals the primary ASN. The specified ASN replaces the secondary ASN, and the primary-segment-table designation replaces the secondary-segment-table designation.

For SSAR-ss, the specified ASN is different from the primary ASN. The specified ASN is used to locate an ASN-second-table entry. The current authorization index and the authority-table origin and length in the ASN-second-table entry are used to locate an authority-table entry, and then the secondary-authority bit is examined to determine if the operation is authorized. If it is, the specified ASN replaces the secondary ASN, and the segment-table designation in the ASN-second-table entry replaces the secondary-segment-table designation.

For Program Call, if the ASN in the entry-table entry is nonzero, it indicates the space-switching (PC-ss) operation. The ASN replaces the primary ASN and is used to locate an ASN-second-table entry. The authorization index, segment table designation, the linkage-table designation in the ASN-second-table entry replace the current authorization index, primary-segment-table designation, and current linkage-table designation, respectively.

For Program Transfer, the specified ASN is different from the primary ASN, indicating the space-switching (PT-ss) operation. The specified ASN is used to locate an ASN-second-table entry. The current authorization index and the authority-table origin and length in the ASN-second-table entry are used to locate an authority-table entry, and then the primary-authority bit is examined to determine if the operation is authorized. If it is, the specified ASN replaces the primary ASN, and the authorization index, segment-table designation, and linkage-table designation in the ASN-second-table entry replace the current authorization index, primary-segment-table designation, and current linkage-table designation, respectively. The segment-table designation in the ASN-second-table entry also replaces the secondary-segment-table designation.

BRIEF DESCRIPTION OF DRAWINGS

FIG. 1 is a general block diagram of a stored program general purpose computer.

FIG. 2 depicts three of the System/370 instruction formats utilized in the present invention.

FIG. 3 depicts the information or data stored in the System/370 defined control registers utilized in practicing the present invention.

FIG. 4 depicts the program status word (PSW) showing one newly defined binary bit position controlling address space operations.

FIG. 5 depicts the information stored in new system control tables utilized in practicing the present invention.

FIG. 14 is a table summarizing the authorization mechanism of the present invention controlling transfer of program control or data between address spaces.

DETAILED DESCRIPTION OF INVENTION

Figure 6:
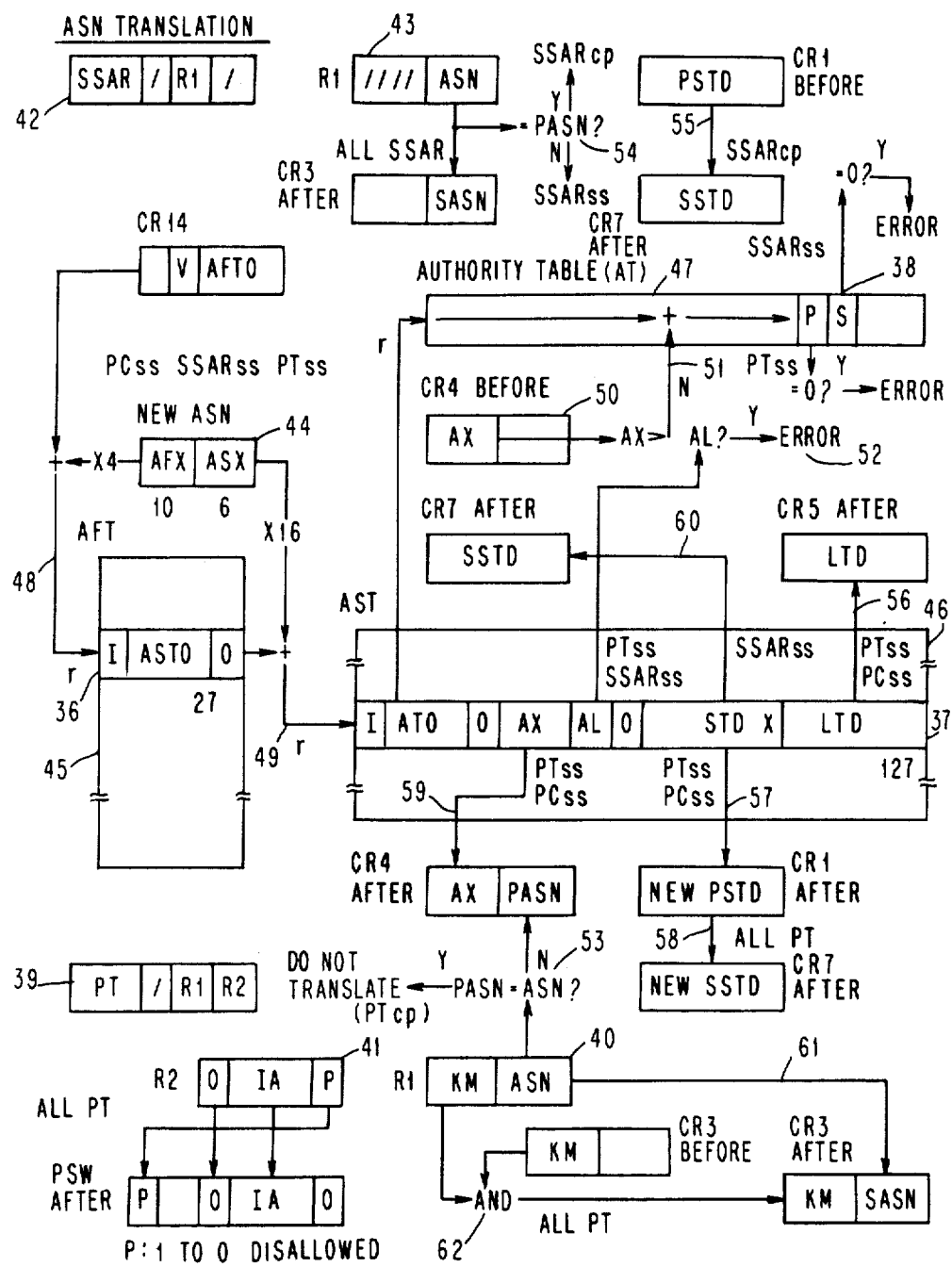
FIG. 6 is a combined logic and data flow diagram for effecting address space number (ASN) translation.

FIG. 1 shows the major functional units of any stored program general purpose computer. The major units include a central processing unit 20, main memory 21, and input/output equipment 22. The central processing unit 20 includes a number of subunits. These include an arithmetic/logic unit 23 where arithmetic and logic functions are accomplished in response to program instructions. During the execution of program instructions, local storage/registers 24 provide temporary storage for intermediate results during instruction execution. The program status word (PSW) 25 is comprised of many fields, and includes an instruction address counter utilized for accessing program instructions from main memory 21 in sequence. Program instructions accessed from main memory 21 will be transferred to an instruction register/decode mechanism 26 for determining the operation to be performed within the central processing unit 20. In response to the decoding of an instruction, execution control apparatus 27 will be rendered effective to accomplish the operation called for by the instruction.

The subunits just described in connection with the central processing unit 20 are found in almost any general purpose computer. As defined in the above cited IBM System/370 Principles of Operation, program-instruction-addressable registers are identified and include sixteen general registers 28 and sixteen control registers 29.

Main memory 21 is comprised of a number of addressable blocks of individual addressable locations. Each block has an associated addressable coded storage protect key as defined in the above cited U.S. Pat. No. Re. 27,251. The main memory 21 is adapted to store information which includes data 30, application or problem programs 31, system control or supervisor programs 32, and a number of system control tables 33.

In describing the present invention, details will be given concerning new system control tables 33, use of control registers 29, not previously used or defined in the IBM System/370 Principles of Operation and certain general registers 28 required for practicing the present invention. Further, reference will be made to the existing fields of the PSW 25 which include the four-bit PSW protect key, P-bit which designates whether the system is in the problem or supervisor program state, and the instruction address portion. An additional bit, not previously defined for the PSW in the IBM System/370 Principles of Operation will also be defined.

It is noted at this time that a number of alternatives for the implementation of execution control 27 are available. In the case of IBM data processing systems which implement the System/370 architecture, U.S. Pat. No. 3,400,371 is representative of an execution control mechanism consisting of a read only store microprogramming technique utilized in the recently announced 4300 series of computers. Recently issued U.S. Pat. 4,200,927 discloses the execution control apparatus for the IBM 3033 data processing system, which includes a combination of hardware sequencers and a microprogram control store.

Some other representative data processing systems which implement the IBM System/370 Principles of Operation include systems manufactured by Fujitsu and Amdahl Corporation which are considered hardwired execution control systems. In the past, these two companies have accomplished the changes and additions to System/370 without the need for changing the hardwired sequencing. It is done by implementing the new System/370 features by means of simulation programs accessed from main memory 21. Systems provided by Magnuson, National Advanced System, IPL, CDC, and Hitachi provide their changes to System/370 functions by means of microprogramming techniques.

FIG. 2 shows the System/370 instruction formats utilized in practicing the present invention. The RRE format includes a 16-bit OP code and provides addressability to a first general register (R1) and to a second general register (R2). The S format instruction includes a 16-bit OP code, addressability to one of the general registers (B2) specifying a base address to which the 12-bit displacement field (D2) is added to obtain an operand, and the operation specified by the OP code utilizes an implied operand. The SS format includes a 8-bit OP code, two 4-bit fields specifying one general register (R1) and another general register (R3). The operation specified by the OP code will involve the two general registers and two operands addressed in main memory utilizing two displacement fields (D1 and D2) added to base address values contained in associated general registers (B1 and B2).

FIG. 3 and FIG. 4 depict the 16 control registers (CR0-15) and the program status word (PSW), respectively, defined in the IBM System/370 Principles of Operation. The control bits or control fields of the CR's not necessary for understanding the present invention have not been shown in FIG. 3. Of the control bits and fields shown in FIG. 3, the information in CR1 has been previously defined for IBM System/370 systems. CR1 provides the address of the origin in main memory, and the length of, a segment table used by a program for implementing the dynamic address translation (DAT) facility for translating virtual or logical addresses to real main memory addresses.

CR1 represents a first addressing control register for storing the main memory address of a particular address translation table. In accordance with the present invention, a second address control register for storing the main memory address of another address translation table is implemented in CR7. There is thus created a primary segment table and a secondary segment table for purposes of virtual to real address translation. Each of the segment tables identified by CR1 and CR7 is associated with an address space number (ASN). The ASN is a 16-bit symbolic identifier of an address space currently defined and connected to the system in accordance with control techniques provided by a supervisor program. An address space is a consecutive sequence of numbers and a specific transformation mechanism which allows each number to be associated with a byte location in main memory. A Primary 16-bit ASN (PASN) associated with the primary segment table origin (PSTO) in CR1 is contained in CR4, bits 16-31. The secondary address space number (SASN) is contained in bit positions 16-31 of CR3 and is associated with the secondary segment table origin (SSTO) in CR7.

A supervisor program must still establish, for any particular address space, an appropriate segment table for address translation. When a secondary segment table has been established for an address space, the supervisor will set the CR0 bit position 5 to a binary 1 indicating that other program instruction operations to be described can utilize and establish a secondary ASN.

Also under supervisor control, is the entry of information into CR14 relative to providing dual address spaces. Bit 12 of CR14 will be set by the supervisor to indicate that certain other program instructions can attempt to establish access to an address space other than that specified by the primary ASN and primary segment table. Whenever a program instruction operation results in the attempt to load a new ASN into either CR3 or CR4, an ASN translation mechanism must be invoked. The result of the ASN translation will be to identify the segment table origin (STO) for the ASN which is being loaded into CR3 or CR4. The translation process will be more thoroughly described but includes an first entry a system control table identified as the ASN-first-table, and the origin (AFTO) of this table in main memory is specified in bit positions 20-31 of CR14.

Bit position 16 of the PSW shown in FIG. 4 has been newly defined. When set to binary 0, all logical or virtual addresses utilized in the data processing system will be translated utilizing the primary ASN segment table. When bit 16 is binary 1, address translation takes place utilizing the secondary ASN segment table. Completing discussion of the PSW in connection with the present invention, the only other fields to be discussed concern the previously defined PSW-key field in bit positions 8-11 which define the storage protect key for the program currently being executed in the system, and the instruction address portion which is manipulated to execute program instructions in a specified sequence.

In accordance with the present invention, one further authority control provided is that represented by bit position 4 of CR0. Prior to the present invention, there were two classes of programs identified by the P bit 15 of the PSW, specifying either a problem program state or a supervisor program state. Any manipulation of the PSW or control data in the CR's had to be done by a supervisor program and only when the PSW indicated that the system was in the supervisor program state. The present invention provides certain manipulation capabilities to programs in the problem program state. This state is known as a "semiprivileged state" and is indicated when bit position 4 of CR0 is a binary 1.

As part of address space management, each program being executed in the system is provided with a supervisor program created authorization index (AX) which is stored in bit positions 0-15 of CR4. Any program executing in the system which attempts to establish addressability to an address space other than its own address space, by attempting to store an ASN in either CR3 or CR4, will be authorized to establish the addressability if the AX used for entry into an authorization table indicates that use of the ASN is authorized. This process will be further described.

As part of the program linkage or calling process, programs executing in the system which attempt to call another program will utilize a program identification code (PC) of the called program to address an entry in a linkage table. The main memory address origin of the linkage table (LTO), and its length, is stored in CR5.

A final feature of the present invention relates to allowing problem programs, when the system is in the problem program state, to utilize coded storage protect key values other than the coded storage protect key assigned in bit positions 8-11 of the PSW. Storage of a key mask (KM) is provided in CR3 bit position 0-15. The PSW key mask provides for levels of control for the access key at entry points made available to a particular program running in the problem state. Bits 0-15 in CR3 correspond to key values 0-15, respectively, which can be expressed by the 4-bit coded storage protect key values. If the mask bit associated with a specified key is 1, then the operation desiring use of a key other than that specified in the PSW is allowed. Also, during the process of calling another program, the key mask in CR3 will be compared with a key mask associated with the called program to determine whether or not the calling program has authority to call the called program without invoking supervisor control.

FIG. 5 depicts the entry format in each of a number of new system control tables utilized in practicing the present invention. When a calling program has identified a called program, the identification of the called program (PC number) is combined with the linkage table origin value in CR5 to obtain entry into a linkage table (LT). The LT entry 34 includes the main memory address of the origin of an entry table (ET) specified in bit positions 8-25. The ET length is in bit positions 26-31. A further portion of the PC number is combined with the entry table origin (ETO) to provide an index to the ET to obtain an entry 35 comprised of an 8-byte entry. The ET entry 35 includes an authority key mask (AKM) in bit positions 0-15, an entry address space number (EASN) in bit position 16-31 which specifies the address space number assigned to the called program. The first instruction of the called program will be accessed from the entry instruction address (EIA) in bit positions 40-62 which will be inserted into the corresponding field of the PSW. Bit position 63 is the P bit also inserted in the PSW to specify either problem or supervisor state. Various parameters to be utilized by the called program will be stored in general registers and are contained in bit positions 64-95. The key mask to be associated with the called program is found in the entry key mask (EKM) in bit positions 96-111.

As part of any attempt to load a new address space number (ASN) into address control registers CR3 or CR4, an ASN translation process is effected. A first table origin (AFTO) is specified in CR14 and a first part of the ASN is utilized as an entry into that table to obtain an ASN first table entry (ASTE) 36 which, in bit positions 8-27 specifies the main memory address of an ASN second table origin (ASTO) which enters into the translation process. The origin of the ASN second table is combined with a further portion of the ASN number to provide an index to an 8-byte ASN second table entry 37. The AST entry 37 includes, in bit positions 8-29, the main memory address of the origin of an authority table (ATO). For the new ASN to be established in the CR's, bit positions 32-47 contain a new authority index (AX). Positions 48-59 indicate the length of the authority table identified in the ATO. Associated with the new ASN being established, is a segment table description (STD) which provides for identifying the length of a segment table in bit positions 64-71 (STL) and the main memory address of the origin of the segment table associated with the ASN in bit positions 72-89 (STO). The linkage table description (LTD) to be inserted in CR5 as part of a change of program control includes, in bit positions 104-120, the main memory address of a new linkage table origin (LTO) and the length (LTL) in bit positions 121-127 of the linkage table.

As part of the ASN translation process for establishing addressability to a new ASN, the authority index (AX) in CR4 of the program currently being executed is used to access an authority table (AT) entry 38, the main memory address of which is specified in the ATO of the ASN second table entry 37. The AX accesses a 2-bit field from the authority table. The binary 0 or 1 state of a P bit or a S bit specify whether or not the ASN being established can be made either a primary (P) or secondary (S) address space.

FIG. 6 is a data flow and logic diagram explaining the process of ASN translation which must be accomplished in certain cases when program instructions cause a new ASN to be inserted in the control registers. Three new instructions, as part of the System/370 instruction set may cause the ASN translation process to be invoked. The new instructions are program call (PC), program transfer (PT), and set secondary ASN (SSAR). All three of these instructions, which may be accessed from a program operating in a primary address space, may specify an ASN to be loaded which is equal to the primary ASN presently effective. If this is the situation, the three instructions are identified as being "current primary" (cp) instructions. If the ASN being loaded as a result of the instruction execution is different from the current primary ASN, a "space switching" (ss) execution is effected causing the ASN translation process to be invoked.

During execution of the PC instruction, the called program, identified by its PC number, may reside in another address space. This will be determined by a PC translation process to be described subsequently. Prior to the execution of PT or SSAR, information to be utilized during the execution of these instructions will have been loaded into designated ones of the general registers which will be identified and addressed by the R1 and/or R2 fields of these instructions.

In FIG. 6, the PT instruction is shown at 39 and the information contained in general registers identified by R1 and R2 is shown at 40 and 41. The SSAR instruction is shown at 42 and the information contained in general register R1 is shown at 43. The new ASN which may or may not require translation is also shown at 44.

During the explanation of the data and logic flow shown in FIG. 6, previous references to system control table entries are shown with the same numerals utilized in FIG. 5.

ASN translation is the process of translating the 16-bit ASN to locate address-space control parameters. ASN translation is performed as part of Program Call with space switching (PC-ss), Program Transfer with space switching (PT-ss), and Set Secondary ASN with space switching (SSAR-ss). For PC-ss and PT-ss, the ASN which is translated replaces the primary ASN in CR4. For SSAR-ss, the ASN which is translated replaces the secondary ASN in CR3. These two translation processes are called primary ASN translation and secondary ASN translation, respectively. The ASN translation process is the same for both primary and secondary ASN translation; only the results of the process are used differently.

The ASN translation process uses two system control tables stored in main memory 21, the ASN first table (AFT) 45 and the ASN second table (AST) 46. They are used to locate the address-space-control parameters, and a third table, the authority table (AT) 47, which is used in PT-ss and SSAR-ss to perform an authorization test.

For the purposes of translation, the 16-bit ASN shown at 44 is considered to consist of two parts: the ASN-first-table index (AFX) comprises the high-order 10 bits of the ASN, and the ASN-second-table index (ASX) comprises the six low-order bits.

The AFX portion of the ASN shown at 44 is used at 48 to select an AFT entry 36 that designates the AST 46 to be used for the second lookup. The 31-bit real address of the AFT 45 is obtained by appending 12 low-order zeros to the AFT origin contained in bit positions 13–31 of CR14. The address of the AFT entry is obtained by appending two low-order zeros and 19-high order zeros to the AFX and adding this 31-bit value to the real address of the AFT, ignoring any carry into bit position 0. All four bytes of the ASN-first-table entry are fetched concurrently. The fetch access is not subject to protection. Bit 0 of the four-byte AFT entry specifies whether the corresponding AST is available.

The ASX portion of the ASN shown at 44, in conjunction with the ASN-second-table origin (ASTO) derived from the AFT entry 36, is used at 49 to select an entry 37 from the AST 46. Bits 1–27 of the AFT entry 36, with four low-order zeros appended, form the 31-bit real address of the AST 46. The address of the AST entry 37 is obtained by appending four low-order zeros and 21 high-order zeros to the ASX and adding this 31-bit value to the real address of the AST, ignoring any carry into bit position 0.

The 16 bytes of the AST entry 37 are fetched left to right, a doubleword at a time. The fetch access is not subject to protection. Bit 0 of the 16-byte AST entry 37 specifies whether the address space is accessible. If this bit is one, an ASX-translation exception is recognized, and the operation is nullified.

ASN authorization is the process of testing whether the program associated with the current authorization index (AX) in CR4 is permitted to obtain addressability to a particular address space. The ASN authorization is performed as part of PT-ss and SSAR-ss. ASN authorization is performed after the ASN translation process for these two instructions.

When performed as part of PT-ss, the ASN authorization checks tests whether the ASN can be loaded into CR4 as the primary ASN, and is called primary-ASN authorization. When performed as part of SSAR-ss, the ASN authorization checks whether the ASN can be loaded into CR3 as the secondary ASN and is called secondary-ASN authorization.

The ASN authorization is performed by means of the authority table 47 which is designated by the authority-table-origin (ATO) and authority-table-length (AL) fields in the AST entry 37.

The authority table 47 consists of a plurality of entries 38 of two bits each. The left bit (P) of an authority table entry 38 controls whether the program with the AX corresponding to the entry is permitted to load the address space as a primary address space using PT. If the P bit is one, the access is permitted. If the P bit is zero, the access is not permitted; a primary authority exception is recognized and the operation is nullified.

The right bit (S) of an authority table entry 38 controls whether the program with the corresponding AX is permitted to load the address space as a secondary address space using SSAR-ss. If the S bit is one, the access is permitted. If the S bit is zero, the access is not permitted; a secondary authority exception is recognized, and the operation is nullified.

The ASN authorization process is performed by using the AX currently in CR4 shown at 50, in conjunction with the authority table origin and length from the AST entry 37 to select at 51 an authority table entry 38. The entry is fetched, and either the primary or secondary authority bit is examined, depending on whether the primary or secondary authorization process is being performed. An AX value greater than the table length (AL) signals an error 52.

Bit positions 8–29 of the AST entry 37 contain the real address of the authority table 47 that controls access authority to the address space, and bit positions 48–59 contain the length of the table (AL).

As part of the authority-table-entry-lookup process, bits 0–11 of the AX are compared against the AL. If the compared portion is greater, then an authority exception (primary for PT-ss and secondary for SSAR-ss) is recognized, and the operation is nullified.

The address of a byte in the AT 47 is obtained by appending 10 high-order zeros to the 14 high-order bits of the AX obtained from bit positions 0–13 of CR4 and adding this value to the authority table origin obtained from the AST entry 37, with two low-order zeros appended. A carry, if any, into bit position 0 is ignored. If the real address thus generated designates a location which is not provided, an addressing exception is recognized, and the operation is suppressed. Protection does not apply to this access.

The byte contains four authority table entries 38 of two bits each. The low-order two bits of the authorization index, bits 14 and 15 of CR4, are used to select one of the four entries. The left or right bit of the entry is then tested, depending on whether the authorization test is for a primary ASN (PT-ss) or a secondary ASN (SSAR-ss). If the selected bit is one, the ASN translation is authorized, and the appropriate address-space-control parameters from the AST entry 37 are loaded into the appropriate control registers. If the selected bit is zero, the ASN translation is not authorized, and a primary authority exception or secondary authority exception is recognized for PT-ss or SSAR-ss, respectively.

Some additional logic decisions are made in FIG. 6, not previously referred to. During a PT instruction execution, the ASN shown at 40 is compared with the primary ASN currently in CR4, and the decision shown at 53 is made indicating whether or not the ASN to be loaded equals the current primary ASN. If yes, (Y) there is no requirement for ASN translation. If the primary ASN does not equal the ASN being loaded, the new ASN shown at 40 will be stored into CR4 to become the new primary ASN.

During a SSAR instruction execution, the decision shown at 54 is made. Here again, the ASN to be loaded into CR3 to become the secondary ASN is compared with the current primary ASN and if equal, an SSAR-cp is indicated showing that the current primary ASN and secondary ASN are the same, and again indicating that no ASN translation is required. An inequality indicates SSAR-ss and will cause the ASN translation to take place. When an SSAR-cp is performed, the primary segment table description in CR1 is transferred at 55 to CR7 to become the secondary segment table description.

During a PT-ss or PC-ss, the linkage table descriptor (LTD) of the AST entry 37 is transferred at 56 to CR5. The segment table descriptor (STD) is transferred to CR1 at 57. For any PT instruction, the primary segment table descriptor in CR1 is transferred at 58 to CR7 to become the secondary segment table descriptor. A new AX is transferred at 59 to CR4.

If an SSAR-ss is being executed, the STD is transferred at 60 to CR7 to become the new secondary segment table descriptor.

To be more completely described subsequently, FIG. 6 shows that during any PT instruction execution, the ASN shown at 40 is transferred at 61 to CR3 to become the secondary ASN. A logical AND combination shown at 62 is performed on the key mask contained in R1 and the key mask presently stored in CR3. This recreates the key mask associated with the program being returned to by PT. Further, the contents of general register R2 are transferred back to the PSW restoring the P-bit, the address space control bit, and the instruction address. During a PT instruction execution, an error or an exception condition is recognized if execution of the PT instruction attempts to change the P-bit from one to zero, this being an indication that an attempt had been made to change the program state from problem to supervisor.

Figure 7:
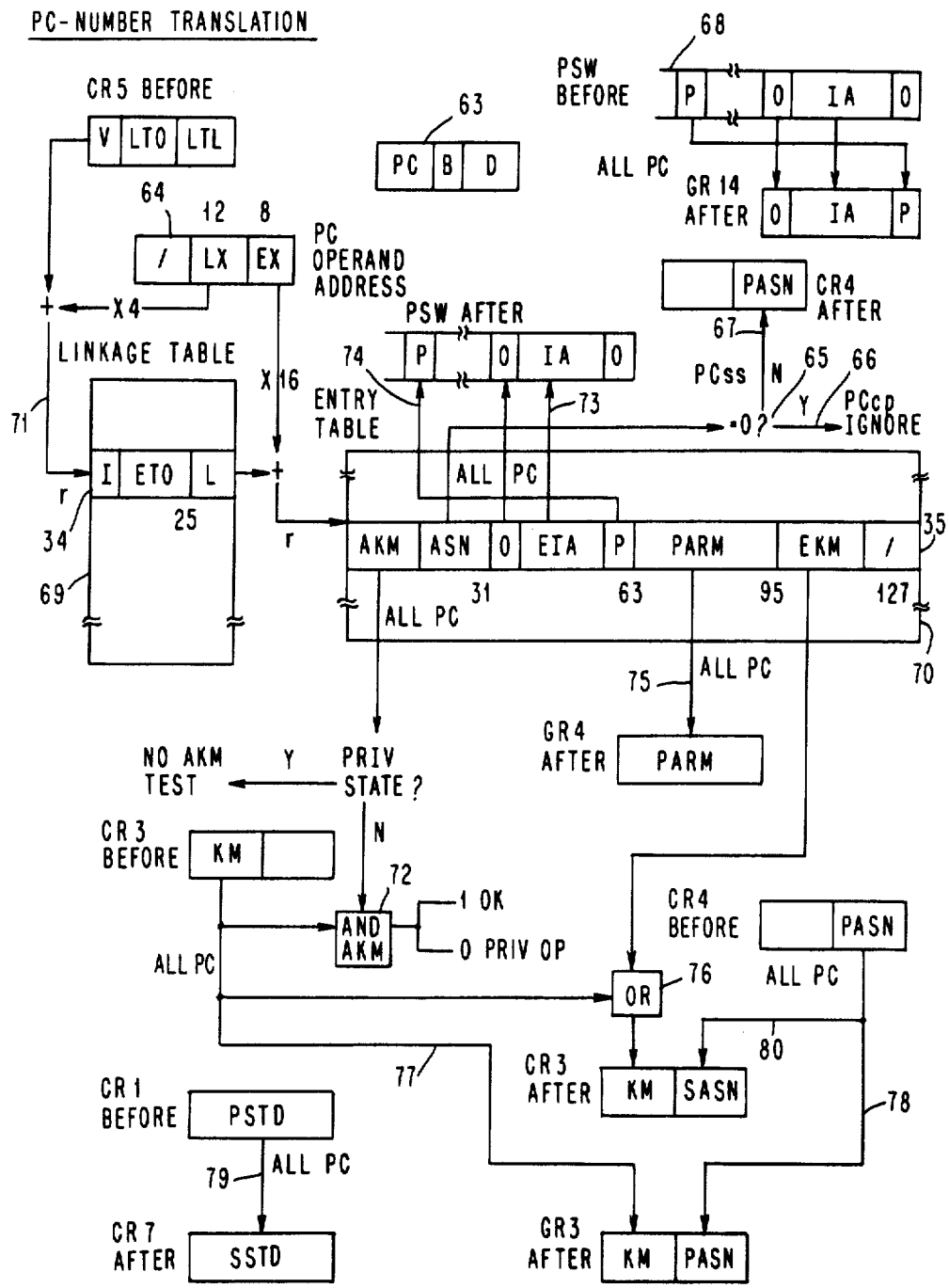
FIG. 7 is a combined logic and data flow diagram for effecting program call (PC) number translation.

FIG. 7 represents the overall data flow and logic diagram involved in translating a symbolic program number to proper table entries for providing the initial instruction address for a called program. Represented at 63 is the Program Call (PC) instruction, the format of which includes the designation of a general register by a B field and a displacement field D. The general register addressed by the B field contains a base address to which the displacement field D is added in the normal creation of an effective address. Instead of using the sum as an address, the low-order 20 bits represent a PC number shown at 64.

In FIG. 7, the designation CR "before" and CR "after" is used. The designation CR "before" relates to information contained in the control register for the current address space and current program which is the calling program. The contents of a control register "after" represent information associated with the called program.

A number of transfers between registers and other control registers or general registers occur for all PC instruction executions. One of the first logic decisions made during the execution of the PC instruction is shown at 65 and involves the determination of whether or not the ASN of the called program equals zero. If the ASN of the called program equals zero, this indicates at 66 that the called program is within the current primary address space and therefore no ASN translation is required. If the ASN associated with the called program is other than a zero, a program call with space switch (PC-ss) is indicated at 67 and the new ASN is transferred into CR4 to become the new primary ASN.

During every PC instruction execution, certain information in the PSW represented at 68 is transferred to general register 14 to be saved for use when returning to the calling program. The information saved includes the P-bit, the address space control bit 16, and the instruction address.

PC number translation is the process of translating the 20-bit PC number to locate an entry-table entry 35 as part of the execution of the Program Call instruction. To perform this translation, the 20-bit PC number shown at 64 is divided into two fields. Bits 12-23 are the linkage index (LX), and bits 24-31 are the entry index (EX). The translation is performed by means of two tables: the Linkage Table (LT) 69 and an Entry Table (ET) 70. Both of these system control tables reside in main storage 21. The origin of the LT 69 resides in CR5. The origin of the entry table 70 (ETO) is designated by means of the LT entry 34.

Bits 8-24 of CR5 with seven zeros appended on the right, form a 24-bit real address that designates the beginning of the LT 69. Bits 25-31 of CR5 designate the length of the LT 69 in units of 128 bytes, thus making the length of the LT variable in multiples of 32 four-byte entries. The length of the LT, in units of 128 bytes, is one more than the value in bit positions 25-31. The LT length is compared against the leftmost seven bits of the linkage-index portion of the PC number to determine whether the linkage index designates an entry within the linkage table.

The LX portion of the PC number is used at 71 to select an LT entry 34. The entry fetched from the LT designates the availability, origin, and length of the corresponding ET 70.

Bits 8–25 of LT entry 34, with six zeros appended on the right, form a 24-bit real address that designates the beginning of the ET 70. Bits 26–31 of entry 34 designate the length of the ET 70 in units of 64 bytes, thus making the ET variable in multiples of four 16-byte entries. The length of the ET in units of 64 bytes, is one more than the value in bit positions 26–31. The ET length is compared against the leftmost six bits of the entry index EX to determine whether the EX designates an entry within the entry table.

The entry 35 fetched from the ET 70 is 16 bytes in length. Bits 0–15 are used to verify whether the program issuing the Program Call instruction, when in the problem state, is authorized to call this entry point. The authorization key mask (AKM) and the current PSW-key mask in CR3 are ANDed at 72, and the result is checked for all zeros. If the result is all zeros, a privileged-operation exception is recognized, and the operation is suppressed. The mask is ignored in the supervisor or privileged program state.

Bits 16–31 specify at 65 whether a PC-ss or PC-cp is to occur. When bits 16–31 are zeros, a PC-cp is specified. When bits 16–31 are not all zeros, a PC-ss is specified, and the bits contain the ASN that replaces the primary ASN.

Bits 40–62, with a zero appended on the right, form the instruction address of the called program which replaces at 73 the instruction address in the PSW as part of the Program Call operation. Bit 63 replaces, at 74, the problem state bit position 15 of the current PSW, as part of the Program Call operation. Bits 64–95 are placed in general register 4 at 75. Bits 96–111 specifying the entry key mask are ORed at 76 into the PSW key mask in CR3 as part of the Program Call operation.

Other transfers that take place during PC instruction execution include the transfer at 77 from the key mask storage in CR3 of the calling program to general register 3 to be saved for subsequent return. Also transferred to GR3 at 78 is the primary ASN in CR4. During any PC instruction execution, the primary segment table descriptor (PSTD) in CR1 is transferred at 79 to CR7 to become the secondary segment table descriptor (SSTD) and the primary ASN in CR4 is transferred at 80 to CR3 to become the secondary ASN. Whether or not the primary segment table descriptor and primary ASN are changed depends on whether or not a PC-ss is signalled at 65 which will initiate an ASN translation in accordance with the data flow and logic shown in FIG. 6.

Figure 8:
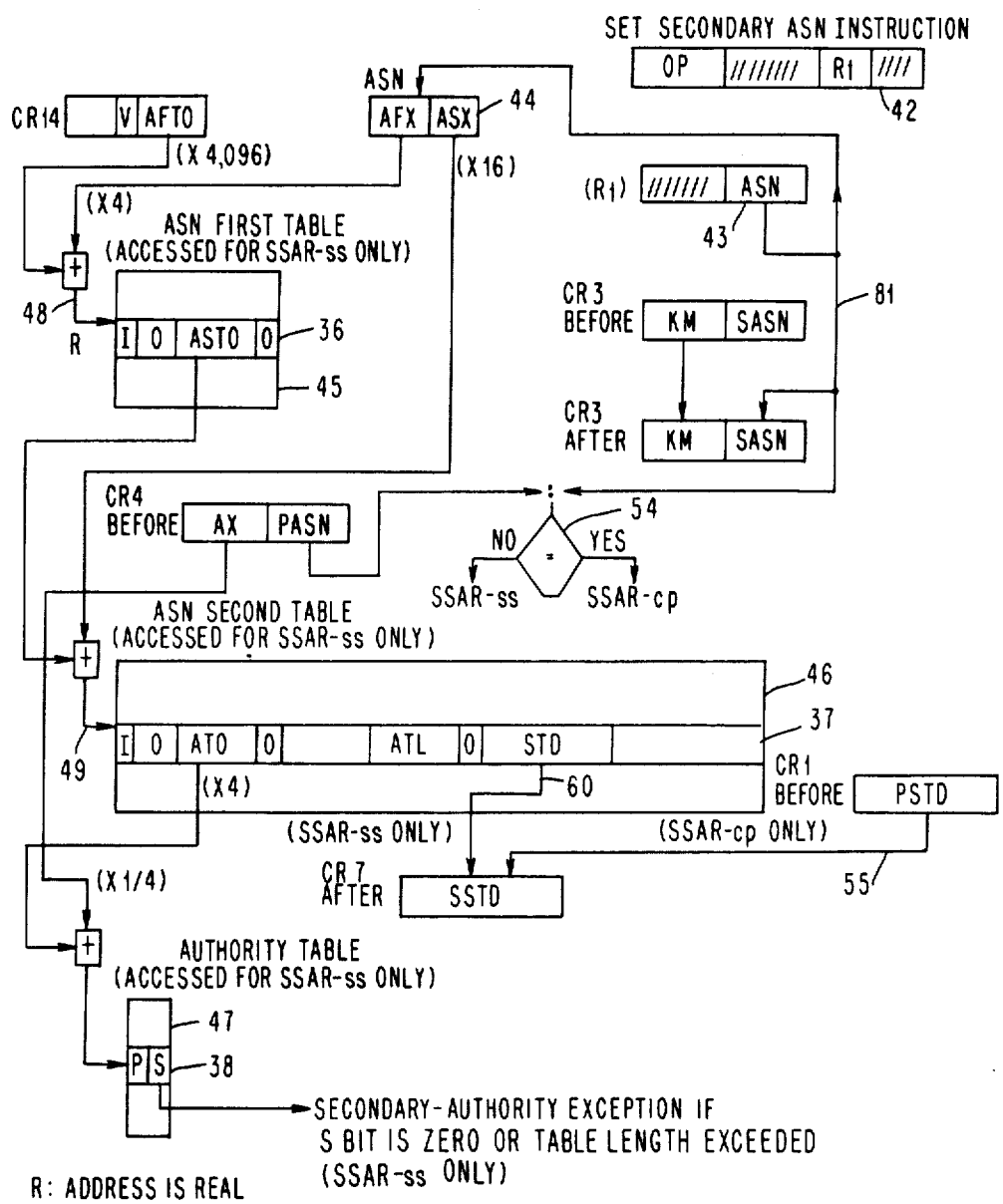
FIG. 8 is a combined logic and data flow diagram for establishing a secondary address space number.

FIG. 8 is a logic and data flow diagram depicting the execution of the new instruction set secondary ASN (SSAR). This is one of the new instructions which causes a new ASN to be loaded into one of the address control registers, namely the secondary ASN stored in CR3, and shown at 81. All the remaining designations for tables, entries, data transfer paths, and logic decisions are as previously designated in the discussion of FIG. 6 with regard to the ASN translation operation.

In summary, the problem program which is executing in the primary address space utilizing the primary segment table descriptor in CR1 executes the SSAR instruction to obtain addressability to data contained in another address space. As indicated previously, each address space has an associated set of address translation tables, and therefore the associated segment table descriptor for the new address space must be stored into CR7 for performing address translation to obtain data in the other address space. CR7 will receive at 55 the primary segment table description if the ASN specified happens to be equal to the primary ASN. Otherwise, if the secondary ASN to be loaded into CR3 is different from the primary ASN, the address translation operation must be performed to obtain the associated segment table descriptor from the ASN second table entry 37, and transferred to CR7 by the path 60. Further, authority checking must be accomplished by effecting access to the authority table 47 to determine whether or not the program executing in the system has authority to establish addressability to the address space as a secondary address space.

Figure 9:
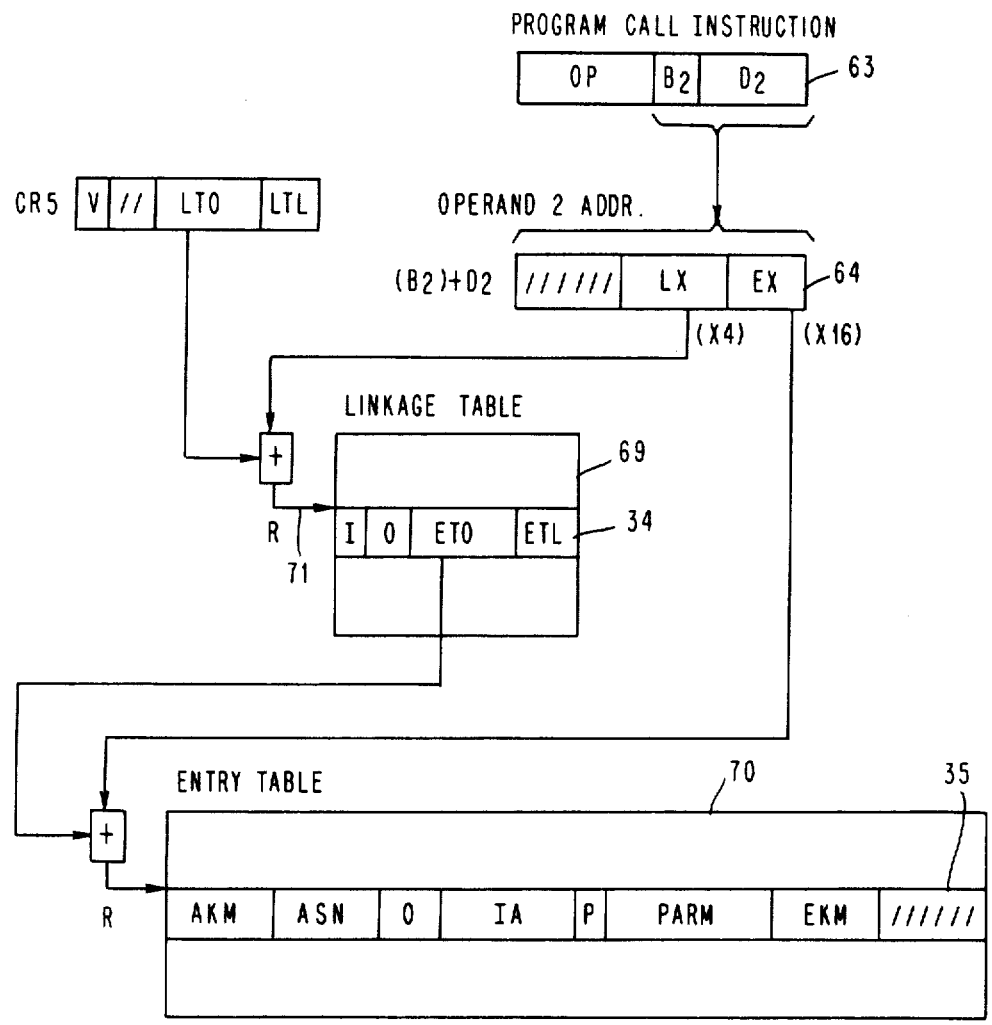
FIGS. 9, 10 and 11 are a combined logic and data flow diagram for effecting transfer of control from a calling program to a called program in accordance with the present invention.
Figure 10:
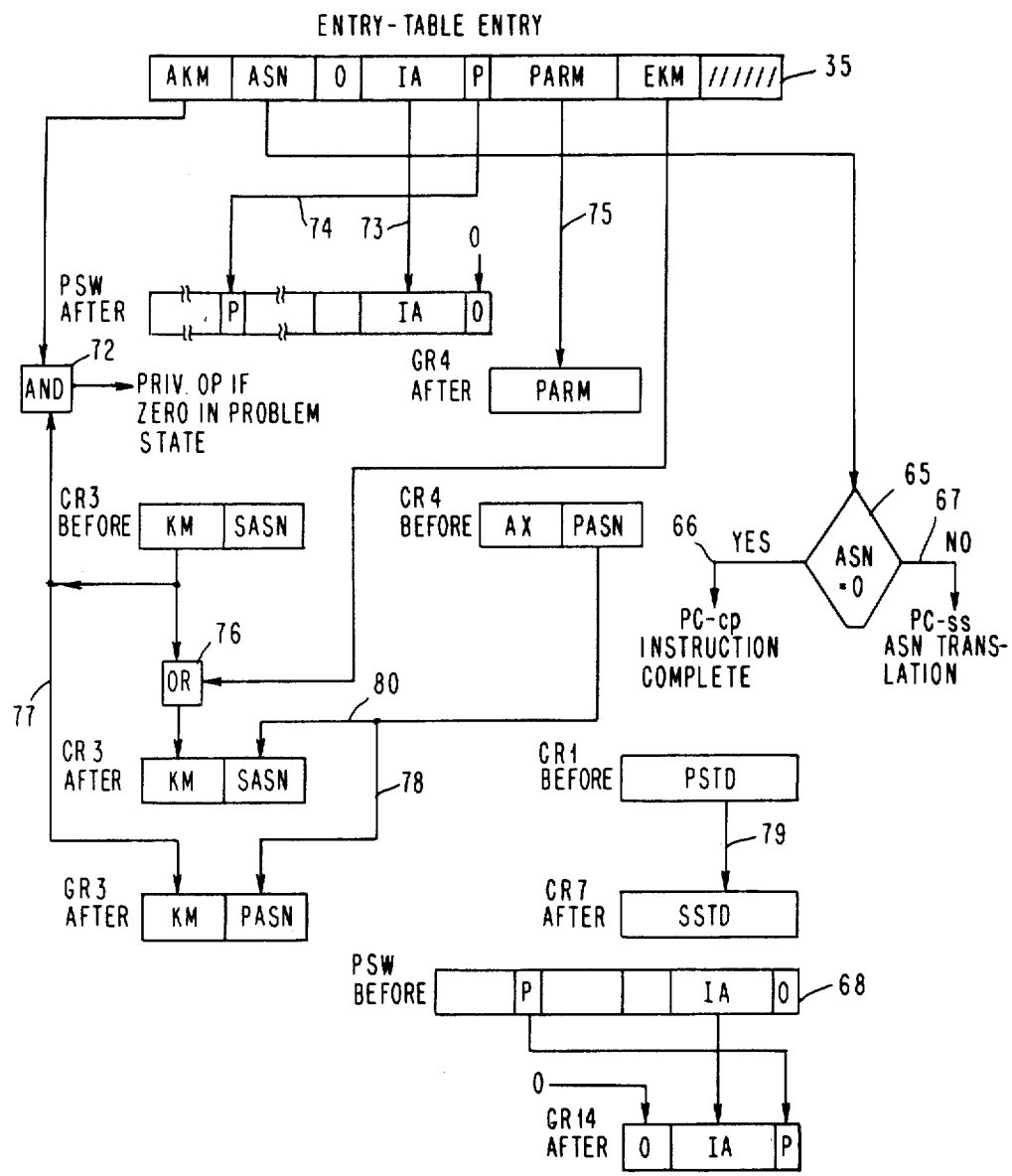
Figure 11:
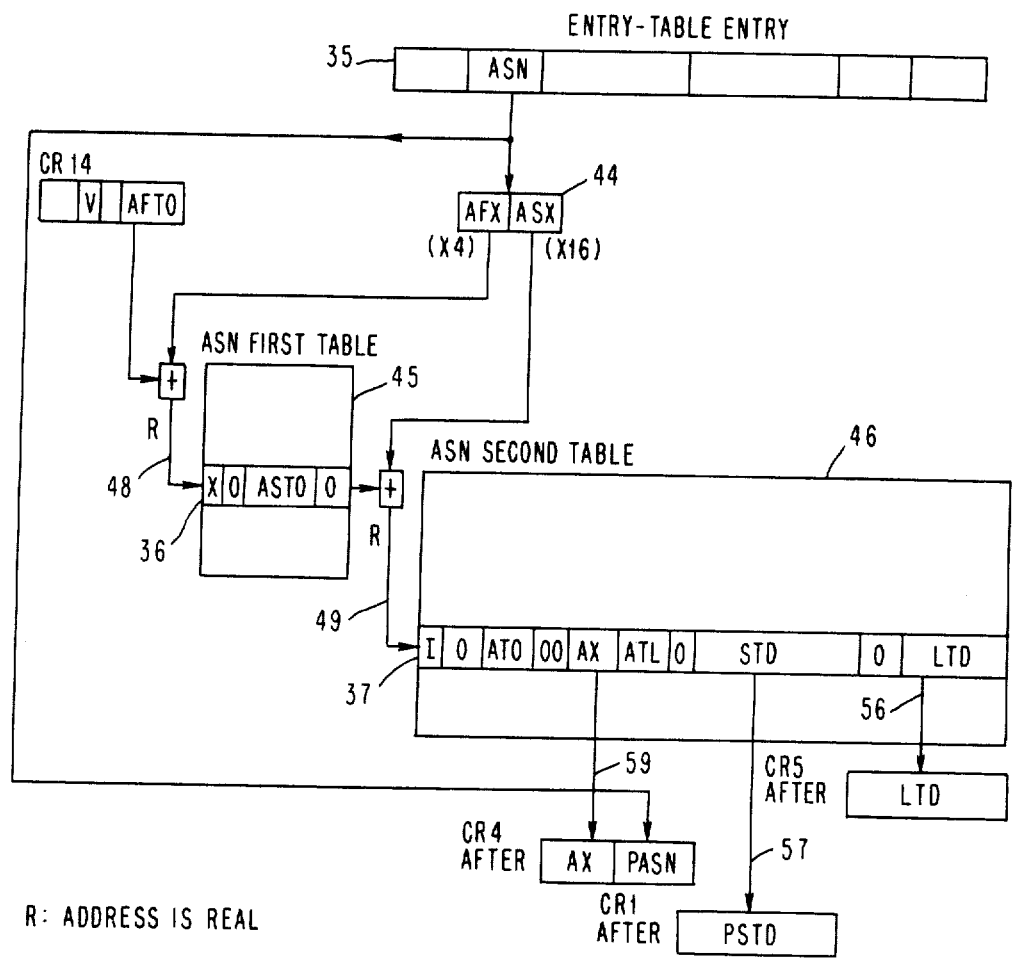

FIGS. 9, 10 and 11 depict the operation performed in executing the Program Call (PC) instruction. These figures show the logic and data flow diagram for the PC instruction in particular and are a simplified showing of the diagrams discussed in connection with FIGS. 6 and 7. The numerals for designating various logic functions and data paths used in FIG. 6 and 7 have been utilized in FIGS. 9, 10 and 11.

As indicated previously, the B2 and D2 fields of the PC instruction shown at 63 are combined by normal address arithmetic to create a PC number shown at 64. The PC translation process includes access to entry 34 in the linkage table 69 which provides further access to the entry 35 in the entry table 70.

As shown in FIG. 10, the first decisions made, if the program making the program call is in the problem state is to perform the AND function 72 between the authority key mask in entry 35 and the key mask in CR3 associated with the calling program. An all zero result indicating identity between the two key masks is considered an error condition and a privileged operation interrupt is generated. In the absence of the privileged operation interrupt, the key mask of the calling program in CR3 is replaced in CR3 by the OR combination shown at 76 with the entry key mask from the entry 35. This provides the called program with the ability to use storage protect keys assigned to the called program by the entry key mask (EKM) and the keys authorized for use by the calling program represented by the key mask in CR3. The original version of the key mask in CR3 associated with the calling program is transferred at 77 and saved in general register 3.

The ASN associated with the calling program contained in CR4 is transferred to GR3 for saving when the called program returns to the calling program. Other information saved in GR14 as a result of executing the PC instruction is the P-bit and instruction address of the PSW, represented at 68, associated with calling program.

The initial instruction address of the called program and the P bit associated with the called program are transferred from the entry 35 to the PSW.

The Program Call may be to a program contained within the address space of the calling program, and if this is so, the ASN value in the entry 35 will equal zero. If so, the secondary ASN and secondary segment table description will be made the same as the primary ASN and associated primary segment table description.

If the ASN number in entry 35 is not equal to zero, then the called program is associated with another address space, indicated at 67, and requires ASN translation shown in FIG. 11. The ASN translation process in FIG. 11, as previously discussed in connection with FIG. 6 and FIG. 8 will load a new ASN and associated segment table descriptor into the address control registers CR4 and CR1 respectively for use in providing address translations during execution of the called program. The called program will also have an associated linkage table, the origin and length of which is transferred at 56 to CR5. The called program will also have an authorization index (AX) which is loaded at 59 into CR4 to provide control for the ability of the called program to establish addressability to other address spaces.

Figure 12:
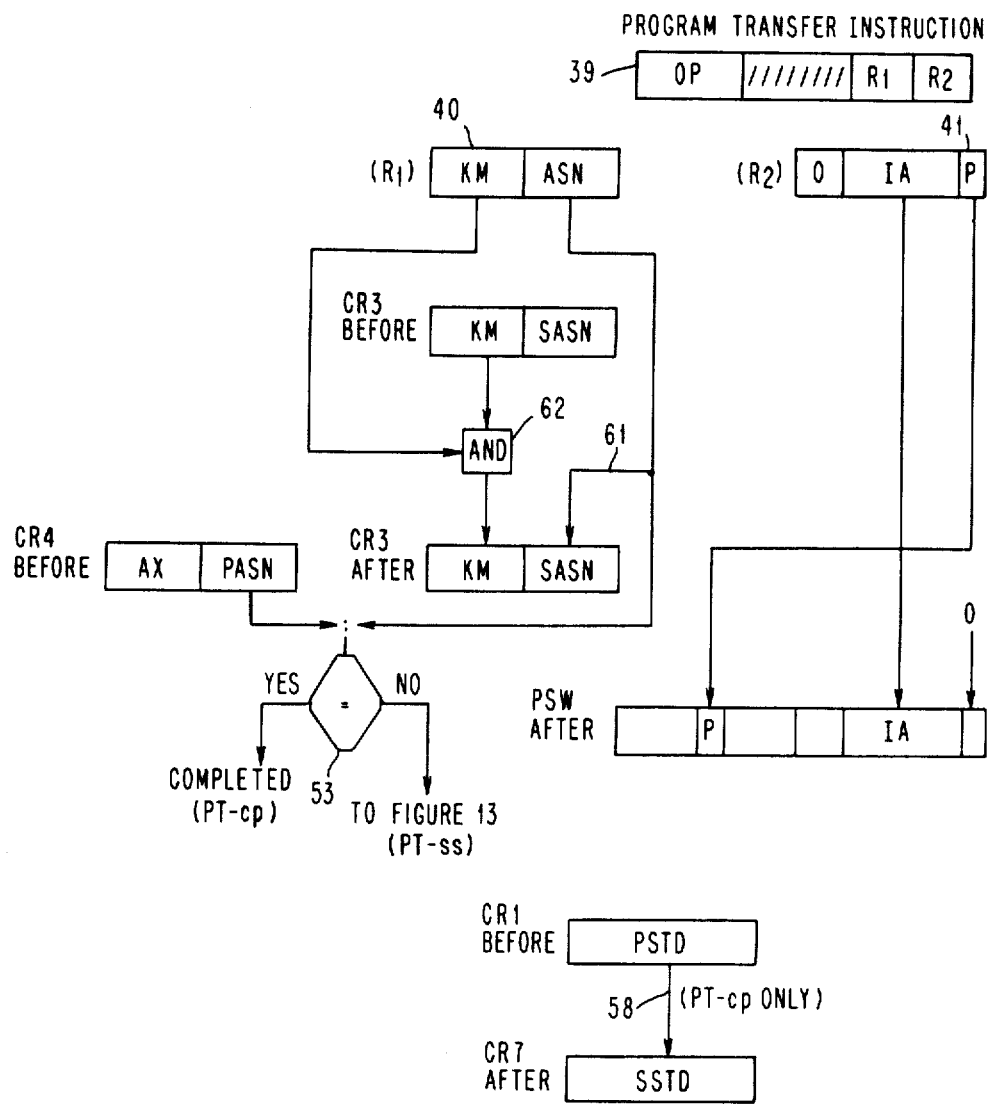
FIGS. 12 and 13 are combined logic and data flow diagrams for returning control from a called program to a calling program in accordance with the present invention.

FIG. 12 depicts execution of the program transfer (PT) instruction previously discussed in connection with FIG. 6. The same designations used in FIG. 6 are utilized in FIG. 12.

The PT instruction identifies two general registers by the R1 and R2 fields. Prior to execution of the PT instruction, the general register represented at 40 and 41 will be loaded with the information saved during execution of the PC instruction. This information includes the key mask, address space number, instruction address, and P bit.

One of the first checks made during execution of the PT instruction is to determine whether or not the ASN being returned to and stored in address control registers is equal to the current primary ASN in CR4. The equality or nonequality is determined at 53, and if equal, all of the information required for doing address translation including the primary segment table descriptor in CR1 will be effective for the program being returned to. Therefore, the primary segment table descriptor in CR1 will be transferred at 58 to CR7 to also be the secondary segment table descriptor. The ASN of the program being returned to will invariably be stored into the secondary ASN portion of CR3 shown at 61.

The next function shown in FIG. 12 is to alter the key mask in CR3, which was being used by the called program, to represent the key mask associated with the program being returned to. This is accomplished at 62 by performing the AND function between the key mask in CR3 and the key mask shown at 40 to replace the key mask in CR3.

Figure 13:
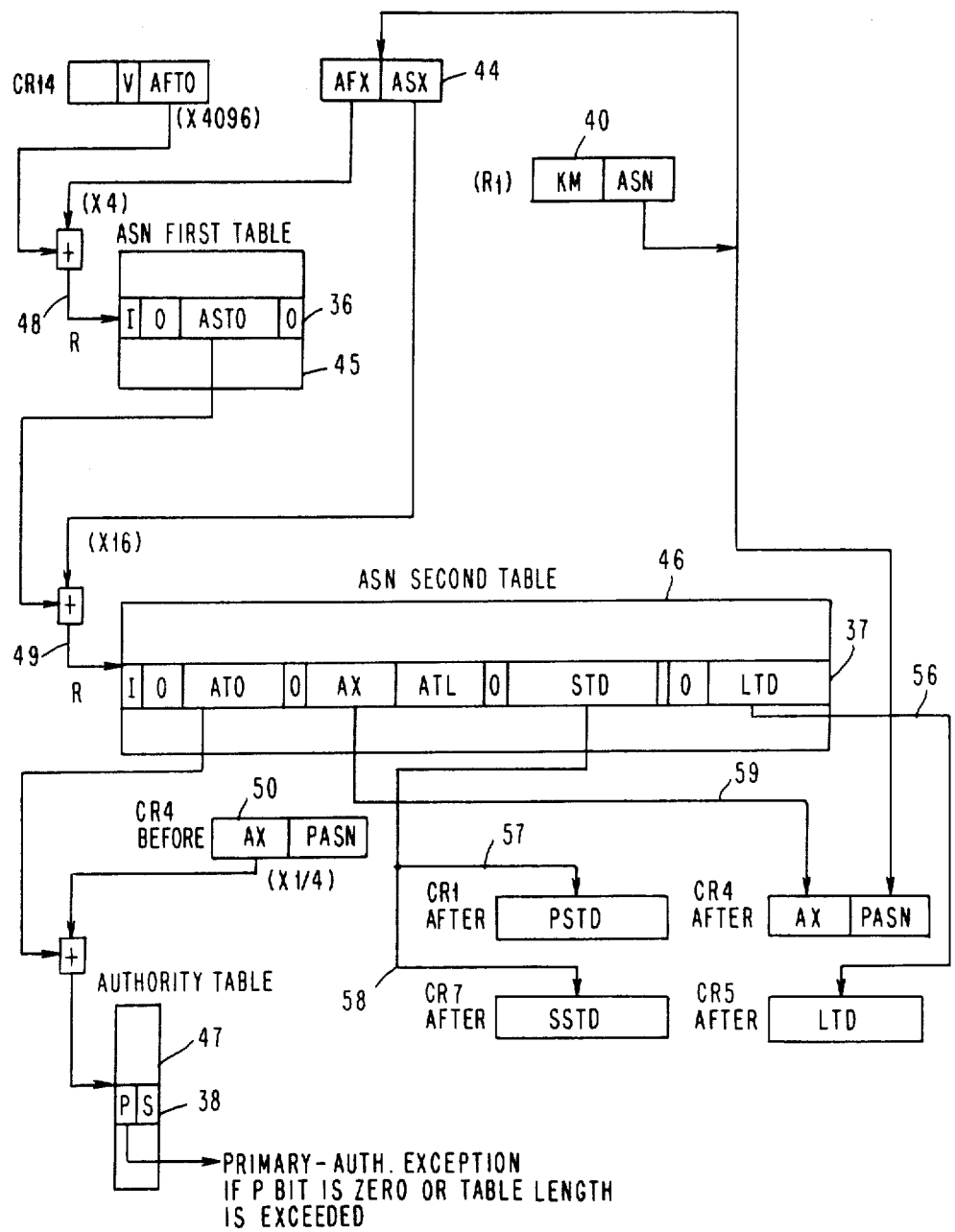

Returning to a program in an address space having a number different from the present primary ASN, indicated at 53, invokes the ASN translation process previously described in connection with FIG. 6, and this is shown in FIG. 13. The ASN translation process uses the new ASN represented at 44 being loaded into the address control registers to provide the sequence of table entries providing access to the ASN first table table 45 and the ASN second table 46. The ASN translation process shown in FIG. 13 thus returns all of the necessary address translation control information required including the primary segment table descriptor to CR1 and CR7, the authorization index to CR4, and the linkage table descriptor to CR5.

The authority table 47 must be accessed during the PT instruction execution to insure that the program which is attempting to return to the present program has authority to return to this program in this particular address space.

FIG. 14 is a table summarizing all of the authorization techniques implemented in the present invention. Also shown are a number of new System/370 instructions which utilize the authorization mechanism in various ways. The prior description has discussed the use of the subsystem linkage control in bit 0 of CR5, ASN translation control in bit 12 of CR14, and use of the authorization index in bits 0-15 of CR4. These mechanisms have been discussed in connection with the new instructions:

Program Call (PC)
Program Transfer (PT)
Set Secondary ASN (SSAR)

Execution of these new instructions has shown the ability of a program executing in the system to establish addressability to data in two different address spaces with associated address translation tables. Having established addressability to data in two different address spaces, concern must be given to providing a problem program executing in the system with knowledge of the coded storage protect key associated with addressed data in main memory which may physically be stored in two different blocks of main memory having two different storage protect keys. Prior to the present invention, any instruction executing in the system at a particular time was only able to utilize the PSW storage protect key previously assigned by the supervisor.

Manipulation of storage protect keys has, prior to this time, been under strict control of the supervisor. The instructions shown in FIG. 14 which utilize the PSW key mask authorization mechanism and extraction authority control mechanism are:

Insert PSW Key (IPK)
Insert Virtual Storage Key (IVSK)
Move to Primary (MVCP)
Move to Secondary (MVCS)
Move With Key (MVCK)
Set PSW Key From Address (SPKA)

The IPK and SPKA instructions have been previously defined in System/370. When authorized by bit 4 of CR0, the IPK instruction can, in problem state, cause the PSW key in the current PSW to be inserted in bit positions 24-27 of general register 2. The SPKA instruction causes the 4-bit PSW key to be replaced by bits 24-27 of an operand addressed from memory. The execution of SPKA is subject to control by the PSW key mask in CR3. When the bit in the PSW key mask corresponding to the PSW key value to be set is 1, the corresponding instruction is executed normally. Otherwise, a privileged-operation exception is recognized.

The IVSK instruction is a new instruction in the RRE format, the execution of which causes the coded storage protect key associated with the physical block addressed by the contents of the general register designated by the R2 field to be inserted in the general register designated by the R1 field. In the problem state, the extraction authority control bit 4 in CR0 must be 1. The block address is a virtual address and is subject to the address space selection bit 16 of the current PSW. The binary state of bit 16 determines whether the virtual address is translated utilizing the primary segment table descriptor or the secondary segment table descriptor.

Providing a problem program executing in the system with the ability to determine the coded storage protect key associated with a particular physical block of main memory and insert that key in a general register, and providing the ability to change the PSW key will provide the problem program with the ability to move data between physical blocks of main memory having different coded storage protect keys.

The MVCP and MVCS instructions are in the SS format. The first operand is replaced by the second operand. One operand is in the primary space, and the other is in the secondary space. The accesses to the operand in the primary space are performed using the PSW key, and the accesses to the operand in the secondary space are performed using the key specified in the third operand.

The addresses of the operands are virtual, one operand address being translated by the means of the primary segment table description in CR1 and the other by means of the secondary segment table description in CR7. Since the secondary space is accessed, movement is performed only when the secondary space control bit 5 of CR0 is 1. For MVCP, movement is to the primary space from the secondary space with the first operand address being translated using the primary segment table, and the second operand address is translated using the secondary segment table.

For MVCS, movement is to the secondary space from the primary space with the first operand address being translated using the secondary segment table and the second operand address is translated using the primary segment table.

Bit positions 24–27 of the general register specified by the R3 field are used as the secondary space access key. In the problem state, movement is performed only if the secondary space access key is valid. The secondary space access key is valid only if the corresponding PSW key mask bit in CR3 is 1. Otherwise, a privileged operation exception is recognized. The contents of the general register specified by the R1 field are a 32-bit unsigned value specifying the number of bytes to be transferred.

The MVCK instruction is an SS format instruction. The first operand is replaced by the second operand. The fetch accesses to the second operand location are performed using the storage protect key specified in the third operand, and the store accesses to the first operand locations are performed using the PSW key. Bit positions 24–27 of the general register specified by the R3 field are used as the source access key. In the problem state, movement is performed only if the source access key is valid. The source access key is valid only if the corresponding PSW key mask bit in CR3 is 1. Otherwise, a privileged operation exception is recognized. The contents of the general register specified by the R1 field are a 32-bit unsigned value indicating the number of bytes to be transferred.

As mentioned before, the present definition of the System/370 is such that only a supervisor program, when the system is in a supervisor program state, is capable of manipulating the control register information or PSW information. Three additional instructions shown in FIG. 14, provided with the semi-privileged state indicated by bit 4 of CR0 are:

Extract Primary ASN (EPAR)
Extract Secondary ASN (ESAR)
Insert Address Space Control (IAC)

The EPAR and ESAR instructions are in the RRE format. When in the problem state, and subject to bit 4 of CR0 being a binary 1, the 16-bit primary ASN in bits 16–31 of CR4 or the 16-bit secondary ASN in bits 16–31 of CR3 are placed in bit position 16–31 of the general register designated by the R1 field.

An instruction shown in FIG. 14 not previously identified is Set Address Space Control (SAC) which is the complementary instruction to IAC. Utilizing these two instructions, a problem program executing in the system can cause the binary state of PSW bit 16 to be controlled. When bit 16 is zero, all virtual addresses are translated utilizing the primary segment table identified in CR1. When bit 16 is a binary 1, only data addresses are translated utilizing the secondary segment table identified in CR7. Since instruction addresses are considered virtual and subject to address translation, a problem program switching between use of the primary or secondary segment tables, without being able to separate data and instruction address translation, must insure that the instruction addresses being translated by the secondary segment table translates to the same physical main memory location as would have occurred if utilizing the primary segment table.

Figure 15:
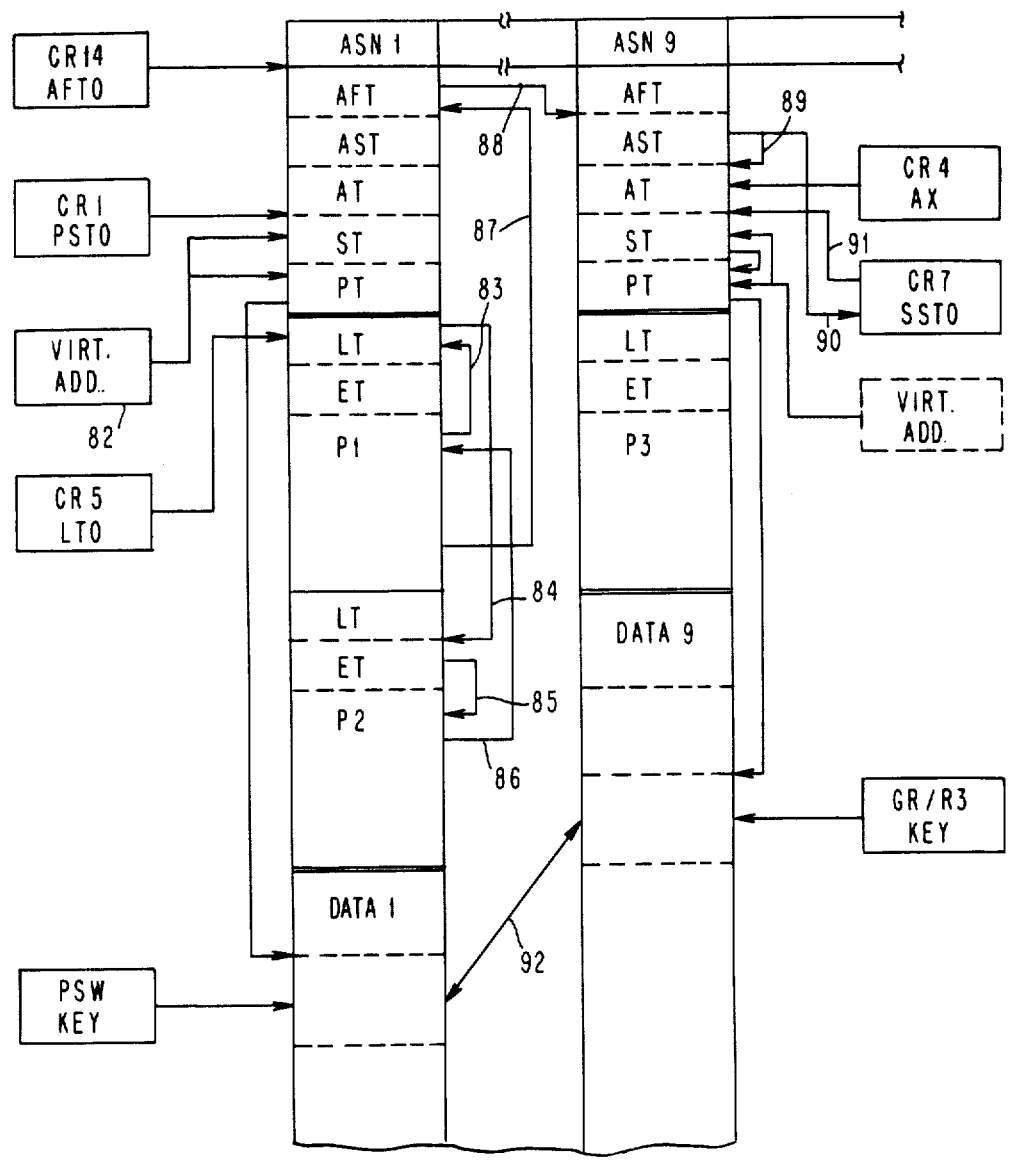
FIG. 15 depicts the interaction between programs, system control tables, and data in a main memory under control of information contained in control registers to effect transfer of control between programs or transfer of data between address spaces.

FIG. 15 is a schematic representation of main memory 21 showing a number of problem programs, data, and system control tables previously identified. The interaction between the various tables, control registers, and general registers is shown with a number of examples.

A supervisor program would have established a number of address space numbers and two have been shown in FIG. 15 represented by ASN 1 and ASN 9. ASN 1 is considered the primary ASN and therefore CR1 provides the main memory address of the origin of the address translation segment table (ST) and associated page table (PT) which respond to virtual addresses shown at 82 in accordance with previously defined dynamic address translation procedures in System/370. It is assumed that the presently executing program in the system is program P1 which at 83 issues a PC instruction identifying program P2. CR5 indicates the origin of the linkage table (LT) associated with P1. The PC translation process defined in FIG. 7 is invoked. As shown, the program being called is program P2. The LT entry obtained utilizing the LX portion of the PC number will provide the origin 84 of the entry table (ET) of program P2. The ET entry will provide the instruction address 85 of the first instruction to be executed in program P2. Further, as depicted in FIG. 15, the ASN in the ET entry obtained will be equal to 0 indicating that the called program P2 is in the same address space as the calling program P1. Therefore, no ASN translation process will be required.

At 86, it is assumed that P2 desires to return control to program P1. The instruction address and other information saved during execution of PC at 83 will be returned to control by execution of the PT instruction issued at 86. Again, no ASN translation will be required.

As program P1 continues to execute, 87 reflects the execution of the instruction SSAR identifying ASN 9. Execution of SSAR requires utilization of the first part of the ASN number to provide access into the ASN first table (AFT) which provides the main memory address 88 of the origin of the ASN in the second table (AST) associated with ASN 9. The AST entry includes the origin 89 of the authority table (AT) which is accessed utilizing the authorization index in CR4 associated with ASN 1. If the establishment of a secondary address space is authorized, the AST entry of the secondary segment table descriptor is transferred at 90 to CR7 to provide the main memory address 91 of the origin of the segment table associated with ASN 9.

Instruction execution can continue in program P1 and include the new instructions which can obtain the storage protect key associated with data in ASN 9, which keys can be inserted in a general register. At this point, instructions in program P1 can cause data transfers shown at 92 to be effected between the primary address space ASN 1 and the secondary address space ASN 9.

Figure 16:
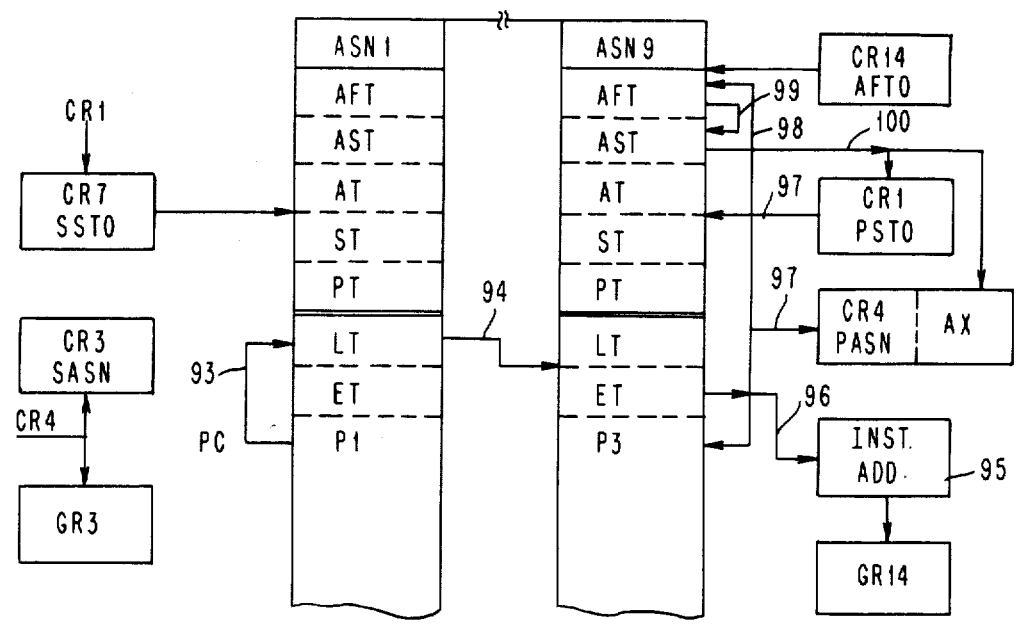
FIG. 16 depicts programs and system control tables in main memory and their interaction with control registers and general registers to effect transfer of program control to a called program in another address space.

FIG. 16 depicts the interaction of system control tables, control registers, and general registers during the execution by problem program P1 of a program call (PC) instruction shown at 93. Depicted is a call to program P3. The PC translation process will utilize the first part of the PC number to address the linkage table (LT) associated with P1. The main memory address 94 of the LT entry points to the entry table (ET) associated with P3. The instruction address shown at 95, associated with program P1, will be transferred to GR14, and the ASN 1 designation in CR4 will be transferred to GR3 and CR3 to become the secondary ASN. The ET entry associated with program P3 will be read out and its contents transferred to various registers. The initial instruction address for program P3 will be transferred at 96 to the instruction address register portion of the PSW. In view of the fact that the PC translation has caused entry into a program in an address space different from ASN 1, the ET entry ASN, when compared with the primary ASN originally in CR4, will indicate the need for ASN translation. The ASN number will be transferred at 97 to become the primary ASN in CR4. The first part of the ASN number will be used to provide an address 98 into the ASN first table, which in turn provides an address 99 to the origin of the ASN second table (AST) where the accessed entry will be read out at 100 to store the associated segment table origin value in CR1 and the authorization index (AX) value into CR4.

As a result, the PC instruction 93 has caused a transfer of program control to a program in an address space different from ASN 1. As a result, a new primary ASN and associated primary segment table descriptor has been provided for the indicated control registers.

Figure 17:
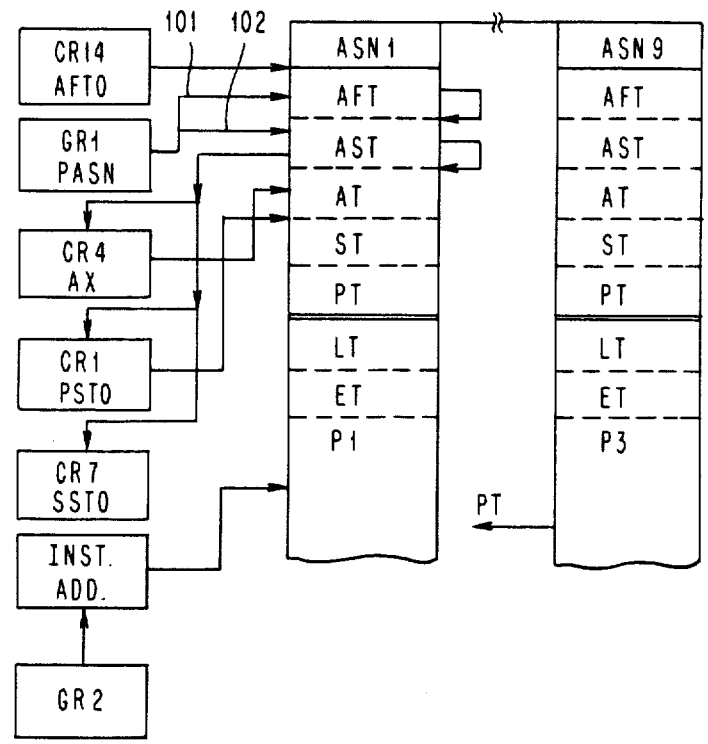
FIG. 17 depicts programs and system control tables in main memory interacting with information in control registers and general registers of a central processing unit to effect return of program control from a called program in one address space to a calling program in another address space.

FIG. 17 shows the interaction when program P3 in ASN 9 returns control to program P1 in ASN 1. Prior to executing the PT instruction, GR2 will have been loaded with the instruction address previously saved in GR14 in response to the PC instruction. The ASN 1 value previously saved in GR3 in response to the PC instruction will have been stored in GR1. In response to execution of the PT instruction, the ASN in GR1 is utilized at 101 and 102 to initiate the previously described ASN translation process which includes access to the authority table (AT) utilizing the authorization index in CR4 associated with program P3. Assuming authorization, the ASN translation process completes whereby CR4 receives a new AX, CR1 receives the primary segment table descriptor associated with ASN 1, and CR7 receives the same segment table descriptor thereby making the primary ASN and secondary ASN the same. The previously saved instruction address for program P1 is inserted into the instruction address portion of the PSW and execution of instructions in program P1 is resumed in ASN 1.

There has thus been shown increased capability and flexibility for an IBM System/370 data processing system which maintains program and data integrity by using storage protect mask bits, establishing a new program mode called semi-privileged for allowing manipulation of PSW and control register information, providing authorization checking for determining the ability of a problem program to establish addressability to data in an other address space, providing addressability to more than one address space with associated address translation tables, and providing the ability to execute instructions utilizing coded storage protect keys other than that provided in the PSW by a supervisor. All of these capabilities are provided to relieve the programming overhead of a supervisor program.

While the invention has been particularly shown and described with references to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. In a multiprogramming data processing system including (1) a main memory comprised of physical, addressable blocks having associated addressable coded storage protect keys providing access control to the associated physical block, the main memory adaptable for storing information including data, problem programs, supervisor programs, and system control tables including addressable address translation tables for translating virtual addresses to real main memory addresses and (2) processor means for extracting and decoding series of program instructions from the main memory and for performing the operations required including the accessing of physical addressable blocks in the main memory for transfer of information between the processor and main memory, the processor including a program status word (PSW) including a plurality of control bits including a problem program bit, the binary state of which signifies a problem or supervisor program state, control fields including a coded PSW protect key field to be compared with the coded storage protect key of a physical block to be accessed in main memory, and an instruction address value indicating the location of the next program instruction to be extracted, the improvement comprising:

a first addressing control register for storing the main memory address of a particular address translation table used for translating addresses of an associated program from virtual to real main memory addresses;

a second addressing control register for storing a plural-bit address space number (ASN), an ASN comprising a symbolic identifier of, and being associated with, said particular address translation table addressed by said first addressing control register; and ASN translation means, including processor control means effective to transfer an ASN for storage in said second addressing control register, and for storing the address of the associated address translation table in said first addressing control register.

2. A system in accordance with claim 1 further including:

further addressing control register means for storing at least one further main memory address of an address translation table, and associated ASN, in response to said ASN translation means; and address space selection means, connected to said first and said further addressing control registers, for controlling which of the address translation tables will be used for translating virtual address to real memory addresses.

3. A system in accordance with claim 2 wherein said further addressing control register means includes:

a third addressing control register for storing the main memory address of a particular address translation table;

a fourth addressing control register for storing an ASN associated with the particular address translation table addressed by said third addressing control register;

said ASN translation means, and said processor control means is effective to transfer an ASN for storage in said fourth addressing control register and for storing the address of the associated address translation table in said third addressing control register.

4. A system in accordance with claim 3 wherein said address space selection means further includes:

dual address space access means, including an address space selection bit, included as part of the PSW, having a first or second binary state respectively associated with said first or said third addressing control registers, to thereby control use of the two address translation tables for translating virtual addresses to real memory addresses.

5. A system in accordance with claim 4 wherein said dual address space access means further includes:

primary access means, responsive to a first binary state of said address space selection bit, for effecting translation of virtual addresses identifying program instructions and data to real main memory addresses under control of said first addressing control register; and secondary access means, responsive to the second binary state of said address space selection bit, for effecting translation of virtual addresses identifying program instructions to real main memory addresses under control of said first addressing control register, and translation of virtual addresses identifying data to real main memory addresses under control of said third addressing control register.

6. A system in accordance with claim 4 wherein said dual address space access means further includes:

data transfer control means, responsive to the first binary state of said address space selection bit, operative in response to a program instruction operation calling for the movement of data between one main memory address and another, for utilizing said first addressing control register for translating a virtual address to said one main memory address, and for utilizing said third addressing control register for translating a virtual address to said another main memory address.

7. A system in accordance with claims 1, 2 or 3 wherein said ASN translation means and said processor control means further includes:

space switch processing means, operative in response to a program instruction operation requirement from a present ASN for access to program instructions included in and designated by another ASN and associated address translation tables effecting the transfer of a new ASN for storage in said second addressing control register.

* * * * *